United States Patent
Yao et al.

(10) Patent No.: US 12,263,818 B2
(45) Date of Patent: Apr. 1, 2025

(54) PISTON PUMP GROUP FOR BRAKE SYSTEM AND CONTROL METHOD THEREFOR

(71) Applicant: BYD COMPANY LIMITED, Guangdong (CN)

(72) Inventors: Yugang Yao, Shenzhen (CN); Guoshan Liu, Shenzhen (CN); Donglin Su, Shenzhen (CN); Jing Liu, Shenzhen (CN); Nan Zhang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/769,012

(22) PCT Filed: Oct. 14, 2020

(86) PCT No.: PCT/CN2020/120884
§ 371 (c)(1),
(2) Date: Apr. 14, 2022

(87) PCT Pub. No.: WO2021/073531
PCT Pub. Date: Apr. 22, 2021

(65) Prior Publication Data
US 2024/0101090 A1    Mar. 28, 2024

(30) Foreign Application Priority Data

Oct. 16, 2019    (CN) .......................... 201910980645.9

(51) Int. Cl.
*B60T 13/20*    (2006.01)
*B60T 13/74*    (2006.01)
(Continued)

(52) U.S. Cl.
CPC ............. *B60T 13/20* (2013.01); *B60T 13/745* (2013.01); *F04B 49/00* (2013.01); *F04B 49/14* (2013.01)

(58) Field of Classification Search
CPC ........ B60T 13/20; B60T 13/745; F04B 17/00; F04B 49/00; F04B 49/14; F04B 2201/1201
See application file for complete search history.

(56) References Cited

U.S. PATENT DOCUMENTS 5,744,884 A * 4/1998 Gerhard .................. F16H 25/20
                                                  318/135
6,102,828 A * 8/2000 MacKenzie ............. E21B 34/16
                                                  475/263
(Continued)

FOREIGN PATENT DOCUMENTS

CN    101169111 A    4/2008
CN    102297223 A    12/2011
(Continued)

OTHER PUBLICATIONS

English Translation of International Search Report from PCT/CN2020/120884 dated Jan. 12, 2021 (2 pages).

*Primary Examiner* — Nathan C Zollinger
(74) *Attorney, Agent, or Firm* — Calfee, Halter & Griswold LLP

(57) ABSTRACT

A piston pump group for a brake system and a control method thereof are provided, and the piston pump group includes: a piston, a pump body provided with an operating chamber, and a transmission mechanism used for driving the piston to move in the operating chamber, where the transmission mechanism includes a lead screw transmission assembly, a follower, and a planetary gear assembly used for transmitting power to the lead screw transmission assembly, the follower is fixedly connected to the piston, the lead
(Continued)

screw transmission assembly is used for driving the follower to move relative to the operating chamber, and a limiting member used for limiting the movement of the follower is disposed between the lead screw transmission assembly and the follower.

16 Claims, 5 Drawing Sheets

(51) Int. Cl.
  *F04B 49/00* (2006.01)
  *F04B 49/14* (2006.01)

(56) References Cited

U.S. PATENT DOCUMENTS

| | | | |
|---|---|---|---|
| 9,982,662 | B2 | 5/2018 | Weh et al. |
| 2005/0077782 | A1 | 4/2005 | Horiuchi et al. |
| 2008/0271553 | A1 | 11/2008 | Wang et al. |
| 2017/0137005 | A1 | 5/2017 | Weh et al. |
| 2017/0166177 | A1 * | 6/2017 | Weh .............. B60T 8/368 |
| 2018/0345934 | A1 | 12/2018 | Weh et al. |
| 2022/0163023 | A1 * | 5/2022 | Weh .............. F04B 17/03 |

FOREIGN PATENT DOCUMENTS

| | | | | |
|---|---|---|---|---|
| CN | 102996679 A | | 3/2013 | |
| CN | 103547801 A | | 1/2014 | |
| CN | 205524220 U | | 8/2016 | |
| CN | 207049259 U | | 2/2018 | |
| CN | 108290562 | | 7/2018 | |
| DE | 102017214859 A1 | * | 2/2019 | ............ B60T 13/745 |
| FR | 3072348 A1 | * | 4/2019 | ............ B60T 13/745 |
| JP | 59196586 A | | 11/1984 | |
| JP | 2011149536 A | | 8/2011 | |
| JP | 2013099840 A | | 5/2013 | |
| JP | 2016133139 A | | 7/2016 | |
| JP | 2017521324 A | | 8/2017 | |
| WO | 03020563 A1 | | 3/2003 | |

* cited by examiner

PISTON PUMP GROUP FOR BRAKE SYSTEM AND CONTROL METHOD THEREFOR

CROSS-REFERENCE TO RELATED APPLICATIONS

This application is the National Stage entry of PCT/CN2020/120884, filed on Oct. 14, 2020, which claims priority to and benefits of Chinese Patent Application Serial No. "201910980645.9", entitled "PISTON PUMP GROUP FOR BRAKE SYSTEM AND CONTROL METHOD THEREOF" and filed by BYD Company Limited with the State Intellectual Property Office of P. R. China on Oct. 16, 2019.

FIELD

This application belongs to the field of hydraulic brake technologies, and in particular, to a piston pump group for a brake system and a control method thereof.

BACKGROUND

In a hydraulic vehicle brake system, a piston pump is used for service braking, and/or slip adjustment. The piston pump generates brake pressure for delivering delivery brake fluid from a wheel brake to the wheel brake after the pressure drops, to increase the wheel brake pressure again, or for delivering the brake fluid in a direction of a main brake cylinder during slip adjustment. However, after the piston pump completes previous movement, a position at which a piston stops is difficult to determine. Therefore, when next braking is required, a braking operation is performed from a position at which the piston stops currently, which cannot ensure that the brake pressure generated by the piston pump reaches an expected effect, so that driving safety is affected.

SUMMARY

This application aims to resolve at least one of the foregoing problems, and provides a piston pump group for a brake system and a control method thereof, which can better achieve an effect of pumping out high-pressure fluid, provide stable brake pressure for the brake system, and have good operating stability.

The technical solutions in this application are implemented as follows: a piston pump group for a brake system is provided, including: a piston, a pump body provided with an operating chamber, and a transmission mechanism used for driving the piston to move in the operating chamber, where the transmission mechanism includes a lead screw transmission assembly, a follower, and a planetary gear assembly used for transmitting power to the lead screw transmission assembly, the follower is fixedly connected to the piston, the lead screw transmission assembly is used for driving the follower to move relative to the operating chamber, and a limiting member used for limiting the movement of the follower is disposed between the lead screw transmission assembly and the follower.

Optionally, the planetary gear assembly includes a drive wheel, an inner gear ring, a planetary cover and a plurality of planetary gears, the plurality of planetary gears are respectively meshed with the inner gear ring, the planetary gears are located between the drive wheel and the inner gear ring, the drive wheel is meshed with the planetary gears respectively, and the planetary cover is connected to the inner gear ring through a positioning structure.

Optionally, the positioning structure includes a groove disposed in a circumferential direction of an inner ring of the planetary cover and a protrusion disposed in a circumferential direction of an outer ring of the inner gear ring and used for cooperating with the groove, or the positioning structure includes a protrusion disposed in the circumferential direction of the inner ring of the planetary cover and a groove disposed in the circumferential direction of the outer ring of the inner gear ring and used for cooperating with the protrusion.

Optionally, the lead screw transmission assembly includes a bearing outer ring, a bearing inner ring, a bearing holder, and a lead screw, the bearing outer ring is sleeved outside the bearing inner ring, the bearing holder is disposed between the bearing outer ring and the bearing inner ring, the bearing holder is provided with a plurality of accommodation cavities used for accommodating ball bearings, the bearing inner ring is fixedly connected to one end of the lead screw, the follower is threadably connected to the lead screw, the planetary gears are disposed on a top surface of the bearing inner ring through a planetary pin, and the planetary cover is fixedly connected to the bearing outer ring.

Optionally, the lead screw and the bearing inner ring are of an integrally formed structure.

Optionally, the lead screw is of a hollow structure, and a through hole is disposed in an axial direction of the lead screw.

Optionally, the limiting member is a limiting pin, the limiting pin penetrates through the bearing inner ring to form a collision portion, and a collision structure used for performing contact limit with the collision portion is disposed on the follower.

This application further provides a control method, used for controlling the foregoing piston pump group for a brake system, and the control method includes zero point calibration of a piston, and includes the following steps:

S10: controlling a motor to rotate in a first direction, to drive a planetary gear assembly to rotate in the first direction, to drive a lead screw transmission assembly to rotate in the first direction, so that a follower moves close to a limiting member with the rotation of the lead screw transmission assembly; and S11: controlling the motor to stop operating when a collision structure of the follower is in contact with the limiting member, so that the planetary gear assembly and the lead screw transmission assembly stop rotating, so that the follower and the piston stop axial movement, and a current position of the piston is a zero point position.

Optionally, the control method further includes: controlling the piston to automatically stop the axial movement in a lower stop point after step S11, where the lower stop point is a position at a preset distance from an inner wall of the bottom of a pump body.

Optionally, the step of controlling the piston to automatically stop the axial movement in a lower stop point includes:

S20: controlling the motor to rotate in a second direction, to drive the planetary gear assembly to rotate in the second direction, to drive the lead screw transmission assembly to rotate in the second direction, so that the follower moves away from the limiting member with the rotation of the lead screw transmission assembly; and obtaining a current rotation number of the motor or a current rotation number of the lead screw transmission assembly in real time;

S21: determining whether the current rotation number exceeds a preset revolution threshold; if the current rotation number does not exceed the preset revolution threshold, performing step S20; and if the current rotation number is equal to the preset revolution threshold, performing step S22; and S22: controlling the motor to stop rotating in the second direction, so that the planetary gear assembly and the lead screw transmission assembly stop rotating in the second direction, so that the follower and the piston stop the axial movement, and the current position of the piston is the lower stop point.

Compared with the related art, the piston pump group for a brake system and the control method thereof provided by this application have the following beneficial effects:

1. A limiting member used for limiting movement of a follower is disposed between a lead screw transmission assembly and the follower, which can prevent the follower from colliding and interfering with another component when the follower moves upward (an operating volume of an operating chamber becomes larger). In addition, zero point calibration of a piston can also be realized by using the limiting member, that is, after the follower is blocked by the limiting member and stops moving, the operating volume of the operating chamber is the largest, and the piston is at a zero point position in this case, to ensure that liquid discharged from the piston pump group has sufficient pressure to provide stable brake pressure for the brake system.

2. A bearing inner ring and a lead screw are of an integrally formed structure, and have high structural strength, and there is no deformation of the bearing inner ring when the bearing inner ring and the lead screw are press-fitted by interference, thereby ensuring stability of an overall structure of the piston pump group.

3. The lead screw is designed by using a hollow structure, which can prevent negative pressure from generating between the piston and the lead screw when the piston moves away from the limiting member (moves downward), or prevent positive pressure from generating between the piston and the lead screw when the piston moves close to the limiting member (moves upward), so that resistance increases when the piston moves, and thus required energy consumption increases when the piston is driven to move.

4. A distance between the piston and the bottom of the operating chamber is determined by determining a relationship between a current rotation number and a preset revolution threshold, that is, the piston is controlled to automatically stop moving at a lower stop point, to prevent the piston from colliding with the bottom of the operating chamber when the piston moves away from the limiting member (moves downward), thereby prolonging a service life of the piston.

Additional aspects and advantages of this application will be given in the following description, some of which will become apparent from the following description or may be learned from practices of this application.

BRIEF DESCRIPTION OF THE DRAWINGS

The foregoing and/or additional aspects and advantages of this application will become apparent and comprehensible in the embodiment description made with reference to the following accompanying drawings, where.

DETAILED DESCRIPTION

Figure 1:
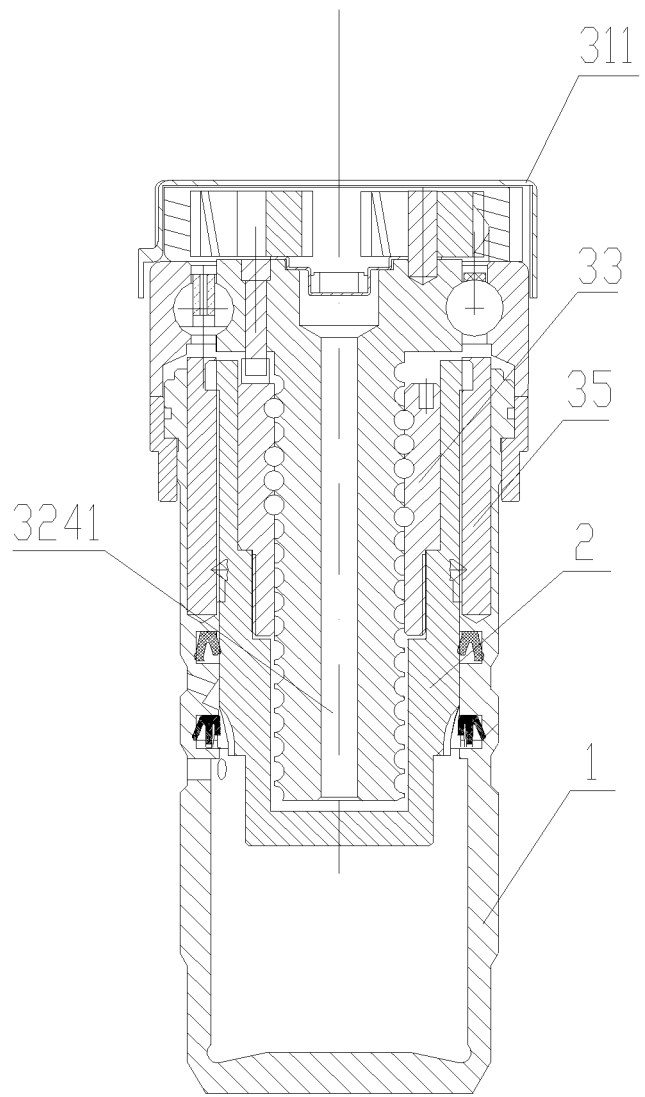
FIG. 1 is a schematic structural diagram of a piston pump group for a brake system according to an embodiment of this application.

Embodiments of this application are described in detail below, and examples of the embodiments are shown in accompanying drawings, where the same or similar elements or the elements having same or similar functions are denoted by the same or similar reference numerals throughout the description. The embodiments described below with reference to the accompanying drawings are exemplary, and are intended to explain this application and cannot be construed as a limitation to this application.

As shown in FIG. 1 to FIG. 5, a piston pump group for a brake system provided by the embodiments of this application includes a piston 2, a transmission mechanism 3, and a pump body 1 provided with an operating chamber. The transmission mechanism 3 is used for driving the piston 2 to reciprocate in the operating chamber to change an operating volume of the operating chamber, and inhale liquid or discharge the liquid with pressure. The transmission mechanism 3 includes a lead screw transmission assembly 32, a follower 33 and a planetary gear assembly 31. The planetary gear assembly 31 is used for transmitting power of a driving element to the lead screw transmission assembly 32, so that the lead screw transmission assembly 32 drives the follower 33 to move relative to the operating chamber in the pump body 1. The follower 33 is fixedly connected to the piston 2, so that the piston 2 can move with the follower 33 (that is, the piston 2 and the follower 33 are used as a whole). A limiting member 34 used for limiting the movement of the follower 33 is disposed between the lead screw transmission assembly 32 and the follower 33, which can prevent the follower 33 (the piston 2) from colliding and interfering with another component when the follower 33 (the piston 2) moves upward (the operating volume of the operating chamber becomes larger). In addition, zero point calibration of the piston 2 can also be realized by using the limiting member 34. After the follower 33 is blocked by the limiting member 34 and stops moving, the operating volume of the operating chamber is the largest (that is, the piston 2 is at a zero point position in this case), to ensure that fluid discharged from the piston pump group has sufficient pressure to provide stable brake pressure for the brake system. During operation, the driving element operates to drive the planetary gear assembly 31 to rotate, to drive the lead screw transmission assembly 32 to rotate, so that the follower 33 (the piston 2) moves close to the limiting member 34 or away from the limiting member 34 with the rotation of the lead screw transmission assembly 32. The movement of the piston 2 changes the operating volume of the operating chamber.

Specifically, the operating chamber of the pump body 1 may be connected to an inhalation valve port and a discharge valve port, and change of the volume of the operating chamber generates a pressure difference, so that liquid (hydraulic oil) is inhaled into the operating chamber through the inhalation valve port, or the liquid (the hydraulic oil) is discharged from the operating chamber through the discharge valve port.

Specifically, the piston pump group for a brake system further includes the driving element used for providing the power. In this embodiment, the driving element is a motor, and the motor is connected to a motor controller and a rotation number sensor. The motor controller is used for controlling stop and operation of the motor. The operation of the motor includes clockwise rotation and counterclockwise rotation of the motor. The rotation sensor is used for obtaining a rotation number of an output shaft.

Optionally, the follower 33 may be connected and fixed to the piston 2 through a threaded structure, that is, the follower 33 is fixed to the piston 2 in a manner of threaded connection, where the threaded structure includes an external thread 331 disposed in a circumferential direction of an outer side of the follower 33 and an internal thread disposed in a circumferential direction of an inner side of the piston 2 (namely, an inner wall of the piston 2), and the external thread 331 of the follower 33 cooperates with the internal thread of the piston 2, to realize connection and fixation of the follower 33 and the piston 2.

When the piston pump group is applied to the field of vehicle brake, it must be ensured that an effect of each brake is predictable. If the piston is deformed, first, the movement of the piston in the operating chamber of the pump body is unsmooth, which may cause that the brake of the piston pump group cannot keep up with a driver's action in time, that is, the brake is slow; second, there is a problem of poor coaxiality between the deformation of the piston and the operating chamber, which causes that the piston and an operating chamber wall are prone to be damaged by friction during operation, so that a service life of the piston is affected; and finally, the deformation of the piston may cause a certain gap disposed between the piston and the operating chamber wall, so that air tightness in the operating chamber is poor, an effect of inhaling liquid into the operating chamber or discharging the liquid out of the operating chamber cannot be ensured when the volume of the operating chamber changes, and brake reliability is thus affected. These problems may affect the brake reliability during driving, and endanger driving safety.

In this application, the follower 33 is fixed to the piston 2 by using the threaded connection, which can ensure that the follower 33, the piston 2, and the operating chamber have good coaxiality, and can also ensure the air tightness of the operating chamber, to provide the stable brake pressure for the brake system, and ensure the driving safety. In another aspect, the follower 33 is threadly connected to the piston 2, which increases a force bearing area of the two, so that a problem of stress concentration can be well avoided, thereby improving a service life of the piston pump group.

Figure 2:
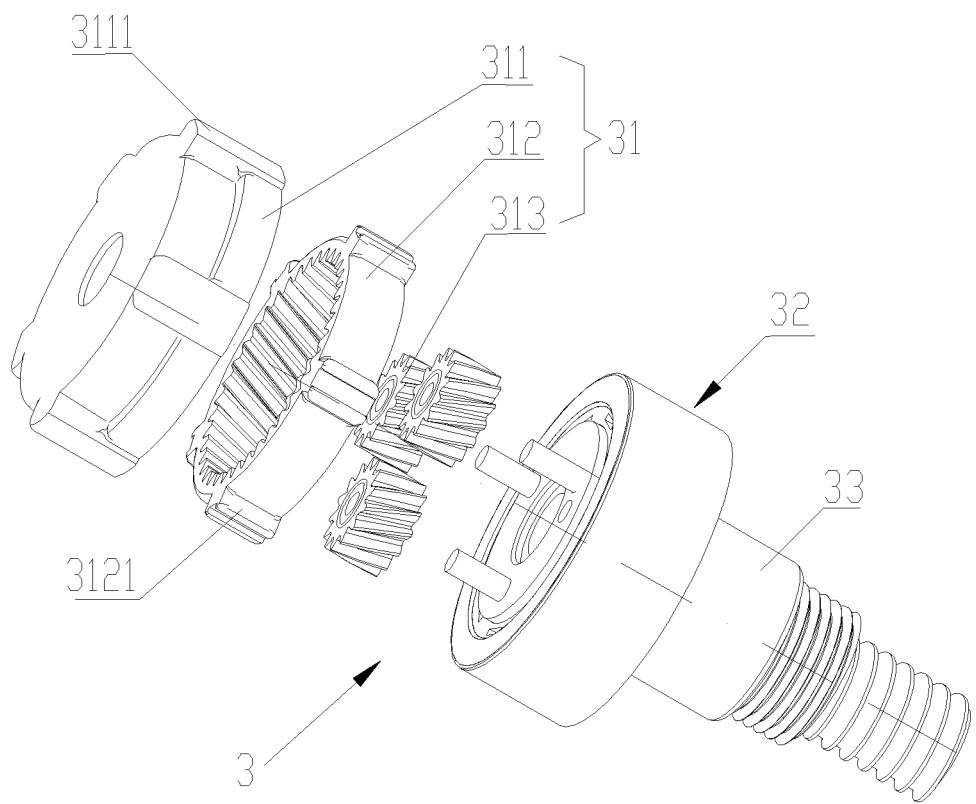
FIG. 2 is a schematic exploded view of a transmission mechanism in a piston pump group for a brake system according to an embodiment of this application.

Optionally, as shown in FIG. 2, the planetary gear assembly 31 includes a drive wheel (not shown in the figure), an inner gear ring 312, a planetary cover 311, and a plurality of planetary gears 313 with the same structure. The planetary gears 313 are meshed with the inner gear ring 312 respectively, the planetary gears 313 are located between the drive wheel and the inner gear ring 312, and the planetary gears 313 are also meshed with the drive wheel respectively. In this embodiment, the drive wheel is used as a sun wheel and is connected to the output shaft of the motor, to transmit the power of the motor to the planetary gears 313, to drive the planetary gears 313 to rotate. The planetary cover 311 is sleeved on the inner gear ring 312, and is connected to the inner gear ring 312 through a positioning structure, to fix the inner gear ring 312. The planetary gear assembly 31 has advantages of a small size, large bearing capability, and stable operation.

In this embodiment, as shown in FIG. 2, there are three planetary gears 313, which are distributed in a form of a circumferential array with respect to a center of the drive wheel. The planetary gears 313, the drive wheel, and the inner gear ring 312 may be of a helical tooth structure, which has characteristics of good meshing, stable transmission, and low noise. In addition, coincidence of helical gears is great, which reduces payloads of each pair of gears and improves bearing capability of the gears. It can be understood that, the drive wheel, the planetary gears 313, and the inner gear ring 312 may also be of a straight tooth structure.

Optionally, as shown in FIG. 2, the positioning structure includes a groove 3111 disposed in a circumferential direction of an inner ring of the planetary cover 311 and a protrusion 3121 disposed in a circumferential direction of an outer ring of the inner gear ring 312 and used for cooperating with the groove 3111, or the positioning structure includes a protrusion disposed in the circumferential direction of the inner ring of the planetary cover 311 and a groove disposed in the circumferential direction of the outer ring of the inner gear ring 312 and used for cooperating with the protrusion. The protrusion 3121 and the groove 3111 use an interference fit, and positioning connection is performed through the protrusion 3121 and the groove 3111, so that assembly connection of the planetary cover 311 and the inner gear ring 312 is easy to realize.

Specifically, there may be a plurality of protrusions 3121, and the protrusions 3121 are distributed on the inner gear ring 312 in the form of the circumferential array. Viewed from an axial direction of the inner gear ring 312, cross-sections of the protrusions 3121 may be of a structure of a rectangle, a triangle, a trapezoid, an arc, or the like. A quantity of grooves 3111 and cross-sections thereof correspond to the protrusions 3121.

Figure 3:
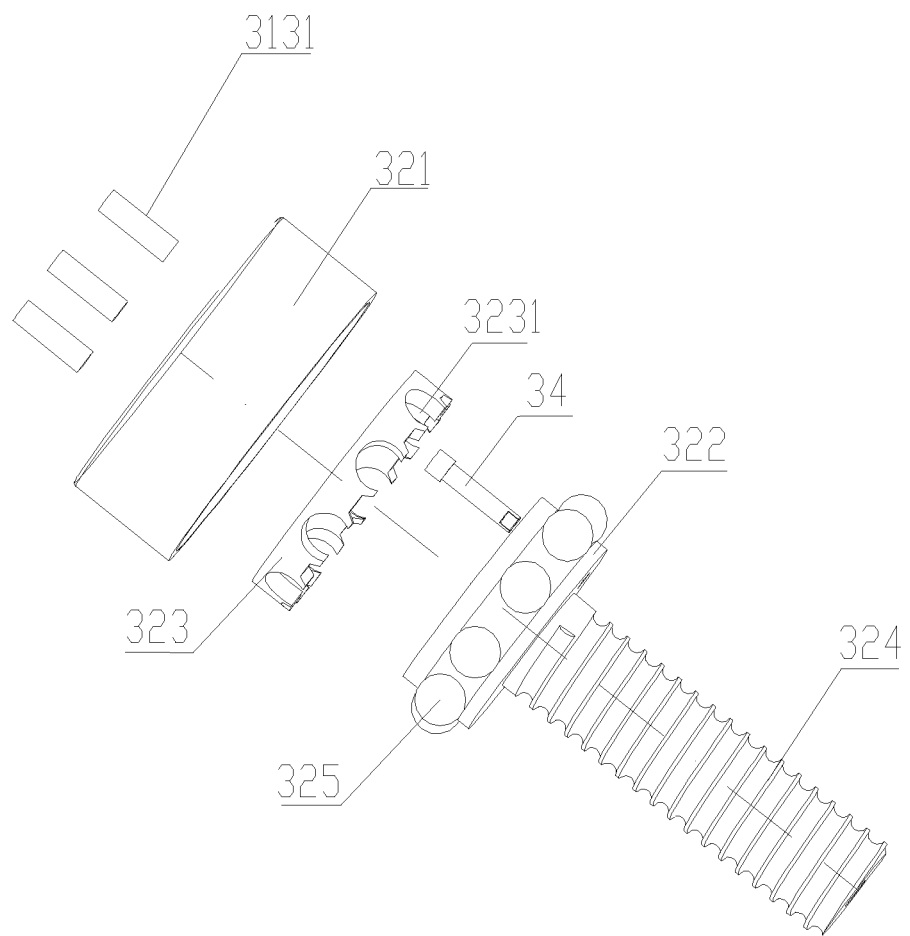
FIG. 3 is a schematic exploded view of a lead screw transmission assembly in a piston pump group for a brake system according to an embodiment of this application.
Figure 4:
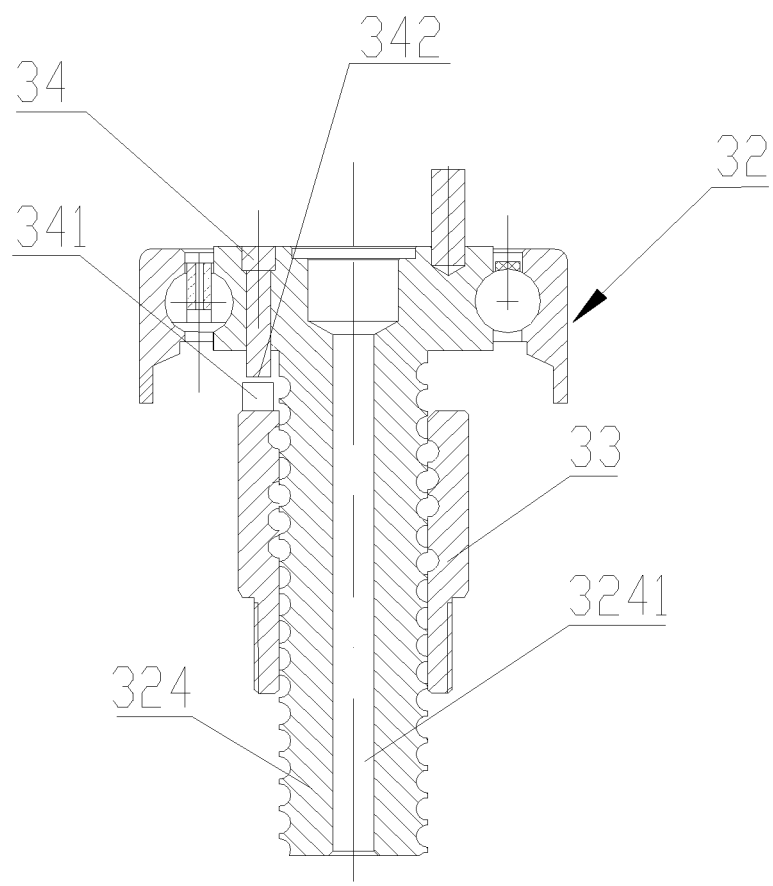
FIG. 4 is a schematic structural diagram of a lead screw transmission assembly in a piston pump group for a brake system according to an embodiment of this application.

Optionally, as shown in FIG. 3 and FIG. 4, the lead screw transmission assembly 32 includes a bearing outer ring 321, a bearing inner ring 322, a bearing holder 323 and a lead screw 324. The bearing outer ring 321 is sleeved outside the bearing inner ring 322, and the bearing holder 323 is disposed between the bearing outer ring 321 and the bearing inner ring 322. The bearing holder 323 is provided with a plurality of accommodation cavities 3231 for accommodating ball bearings 325, and the bearing inner ring 322 is rollingly connected to the bearing outer ring 321 through the ball bearings 325. The bearing inner ring 322 is fixedly connected to one end of the lead screw 324, and the planetary gears 313 are respectively disposed on a top surface of the bearing inner ring 322 through a planetary pin 3131. The planetary gears 313 may rotate relative to the bearing inner ring 322 around the planetary pin 3131, and the planetary gears 313 may also rotate relative to the inner gear ring 312 simultaneously, to drive the bearing inner ring 322 (the lead screw 324) to rotate. The follower 33 is threadedly connected to the lead screw 324, so that the follower 33 can axially move (close to or away from the limiting member 34) relative to the lead screw 324 with the rotation of the lead screw 324. The planetary cover 311 is connected and fixed to the bearing outer ring 321 by welding, and the inner gear ring 312 is clamped in the planetary cover 311 by the bearing outer ring 321. It can be understood that, the planetary cover 311 may also be connected and fixed to the bearing outer ring 321 by using screws.

Optionally, as shown in FIG. 3 and FIG. 4, the lead screw 324 and the bearing inner ring 322 are of an integrally formed structure, cross-sections of the lead screw 324 and the bearing inner ring 322 may be T-shaped, and a center of the bearing inner ring 322 coincides with a central axis of the lead screw 324. By using the design of the integrally formed structure, the structure has high strength, and can also prevent the bearing inner ring 322 from easily deforming when the lead screw 324 and the bearing inner ring 322 are press-fitted by interference, so that the bearing inner ring 322 rolls smoothly, and reliability of the overall operation of the piston pump group is ensured.

Optionally, as shown in FIG. 4, the lead screw 324 is of a hollow structure, and a through hole 3241 is disposed in an axial direction of the lead screw 324. The through hole 3241 and the lead screw 324 are coaxially disposed, that is, a central axis of the through hole 3241 coincides with the central axis of the lead screw 324, to ensure that a center of mass of the lead screw 324 is on the central axis during rotation. The lead screw 324 is designed to the hollow structure.

1. The through hole 3241 makes a cavity formed between the piston 2 and the lead screw 324 be connected to the outside, which can prevent a volume of the cavity from becoming larger to generate negative pressure when the piston 2 moves downward (an axial distance between the piston 2 and the lead screw 324 increases), or can prevent the volume of the cavity from becoming smaller and being compressed to generate positive pressure when the piston 2 moves upward (the axial distance between the piston 2 and the lead screw 324 becomes smaller), thereby ensuring that the piston 2 is not affected by the change of the volume of the cavity during movement, preventing the movement of the piston 2 from being affected by the positive pressure or the negative pressure, and effectively reducing required energy consumption when the piston 2 is driven to move.

2. A material cost of the lead screw 324 can be effectively reduced.

3. Mass reduction of the lead screw 324 reduces inertia, and can improve a response speed of the lead screw transmission assembly 32 during transmission.

Specifically, a diameter of the through hole 3241 is ⅕ to ½ of a diameter of the lead screw 324.

Optionally, as shown in FIG. 1, the bearing outer ring 321 is connected to the pump body 1 through a connecting member 35, and the planetary gear assembly 31 and the lead screw transmission assembly 32 are installed and fixed on the pump body 1. In this embodiment, the bearing outer ring 321 is integrated with the pump body 1 through the connecting member 35 in a manner of press fitting by interference. When the piston pump group operates, the planetary cover 311, the inner gear ring 312, and the bearing outer ring 321 are all fixed and do not move, to support the planetary gears 313, the bearing inner ring 322, and the lead screw.

Optionally, as shown in FIG. 4, the limiting member 34 is a limiting pin, the limiting pin penetrates through the bearing inner ring 322, a collision portion 342 is formed on one side of the limiting pin toward the follower 33, and a collision structure used for performing contact limit with the collision portion 342 is disposed on the follower 33. When the follower 33 moves toward the bearing inner ring 322 (a direction of the planetary gear assembly 31), the collision structure disposed on the follower 33 and the collision portion 342 on the bearing inner ring 322 gradually approach and finally contact to generate a collision signal, and the motor stops rotating immediately after receiving the collision signal, and the lead screw 324 stops rotating simultaneously, so that the piston 2 stops moving and stops at a current position. The movement of the follower 33 is limited by setting the limiting member 34, to prevent the follower 33 from colliding and interfering with the bearing inner ring 322 when the piston 2 returns. In actual applications, the zero point calibration of the piston 2 may also be performed by using the limiting member 34, to ensure that the piston 2 is at the zero point position each time the piston 2 operates (definition: the zero point position is a position of the piston 2 when the operating chamber is at a maximum operating volume).

Specifically, the limiting member 34 is threadedly connected to the bearing inner ring 322, and a length of the collision portion 342 may be controlled by adjusting a length of the limiting member 34 penetrating through the bearing inner ring 322, to limit a movement stroke of the piston 2 to the limiting member 34, and adjust the maximum volume of the operating chamber. In addition, the limiting member 34 is easy to replace after being damaged by collision.

Figure 5:
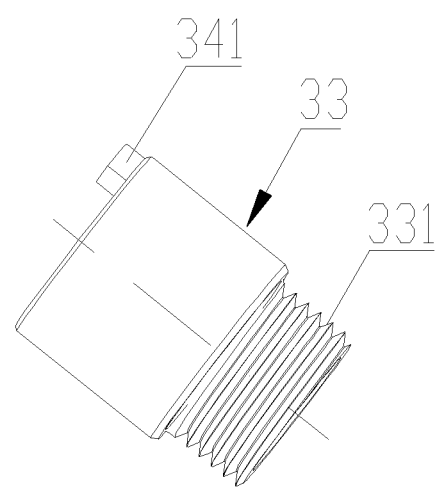
FIG. 5 is a schematic structural diagram of a follower in a piston pump group for a brake system according to an embodiment of this application.

In this embodiment, as shown in FIG. 5, the follower 33 may be a nut, the external thread 331 is disposed at a lower end of an outer circumferential direction of the nut, and the collision structure may be integrally formed on a boss 341 at a top end of the nut. After the boss 341 is in contact with the collision portion 342, the nut (the piston 2) stops moving immediately, and a current position of the piston 2 is the zero point position. A total length of the nut is 40.3 mm (which includes the boss 341 of 3 mm), and a length of the external thread 331 is 14 mm. It can be understood that, the collision structure is mainly used for positioning the collision portion 342. Therefore, the collision structure may also be a groove disposed in a top surface of the nut.

This application further provides a control method, used for controlling the foregoing piston pump group for a brake system, and the control method includes zero point calibration of a piston 2, that is, the piston 2 needs to be first moved to a zero point position before operation, to ensure that pressure of liquid initially discharged by the piston pump group is an expected value, and a brake effect is stable. For ease of understanding, this embodiment describes with reference to a motor, and specific steps are as follows:

S10: controlling a motor to enable and rotate in a first direction, to drive a planetary gear assembly 31 to rotate in the first direction, to drive a lead screw transmission assembly 32 to rotate in the first direction, so that a follower 33 moves close to a limiting member 34 with the rotation of the lead screw transmission assembly 32, and the piston 2 moves close to the limiting member 34 with the follower 33; and S11: generating a collision signal when a collision structure of the follower 33 is in contact with the limiting member 34; feeding back, by a rotation sensor of the motor, the collision signal to a motor controller after receiving the collision signal; and generating, by the motor controller, an instruction of stopping operation, and executing the instruction of stopping operation, so that the motor stops rotating in the first direction, so that the planetary gear assembly 31 and the lead screw transmission assembly 32 stop rotating, and then the follower 33 and the piston 2 stop axial movement, and a current position of the piston 2 is a zero point position. The piston 2 may alternatively stop automatically at the zero point position by means of limiting, to prevent the piston 2 from colliding with another component.

Optionally, the method further includes: controlling the piston 2 to automatically stop the axial movement in a lower stop point after step S11, where the lower stop point is a position at a preset distance from an inner wall of the bottom of a pump body 1, and specifically, to a position of the piston 2 when a distance between the piston 2 and the inner wall of the bottom of the pump body 1 (the bottom of an operating chamber) is equal to a preset distance.

Optionally, the step of controlling the piston 2 to automatically stop the axial movement in a lower stop point includes:

S20: controlling the motor to rotate in a second direction after the piston 2 stops at the zero point position, to drive the planetary gear assembly 31 to rotate in the second direction, to drive the lead screw transmission assembly 32 to rotate in the second direction, so that the follower 33 moves away from the limiting member 34 with the rotation of the lead screw transmission assembly 32, an operating volume of the operating chamber becomes smaller gradually with the movement of the piston 2, the operating chamber is compressed to generate pressure to discharge liquid in the operating chamber from a discharge valve port, and the discharged liquid has certain pressure; and obtaining a current rotation number of the motor (where the motor controller may obtain a rotation number of an output shaft of the motor through the rotation number sensor) or a current rotation number of the lead screw transmission assembly 32 (that is, a rotation number of a lead screw 324, which may be indirectly obtained by obtaining the rotation number of the motor) in real time;

S21: determining whether the current rotation number exceeds a preset revolution threshold, to determine whether the piston 2 moves to the lower stop point, where the preset revolution threshold is the rotation number of the output shaft of the motor or the rotation number of the lead screw 324 when the piston 2 moves from the zero point position to the lower stop point; if the current rotation number of the motor or the current rotation number of the lead screw transmission assembly 32 does not exceed the preset revolution threshold, performing step S20; and if the current rotation number of the motor or the current rotation number of the lead screw transmission assembly 32 is equal to the preset revolution threshold, performing step S22; and S22: if the current rotation number of the motor or the current rotation number of the lead screw transmission assembly 32 is equal to the preset revolution threshold, generating, by the motor controller, an instruction of stopping operation, and executing the instruction of stopping operation, so that the motor stops rotating in the second direction, and the planetary gear assembly 31 and the lead screw transmission assembly 32 stop rotating in the second direction, to control the follower 33 (the piston 2) to stop moving, and the piston 2 stops at the lower stop point, that is, the piston 2 automatically stops moving once the piston 2 reaches the lower stop point, to prevent the piston from colliding with a bottom surface of the operating chamber.

If the current rotation number of the motor or the current rotation number of the lead screw transmission assembly 32 does not exceed the preset revolution threshold, the motor controller generates an instruction of continuing operation, and executes the instruction of continuing operation, to control the motor to continuously rotate in the second direction, until the current rotation number of the motor or the current rotation number of the lead screw transmission assembly 32 is equal to the preset revolution threshold (the piston 2 moves to the lower stop point), and control the motor to stop rotating in the second direction.

In this embodiment, the first direction and the second direction are determined according to a rotation direction of a thread of the lead screw 324. For example, if the thread of the lead screw 324 is right-handed, the first direction is a counterclockwise direction, and the follower 33 moves upward relative to the lead screw 324; and the second direction is a clockwise direction, and the follower 33 moves downward relative to the lead screw 324. If the thread of the lead screw 324 is left-handed, the first direction is the clockwise direction, and the follower 33 moves upward relative to the lead screw 324; and the second direction is the counterclockwise direction, and the follower 33 moves downward relative to the lead screw 324.

An operating process of the piston pump group for a brake system of this application is as bellow: zero point calibration is first performed on the piston 2, the piston 2 is then controlled to move downward to the lower stop point from the zero point position, to discharge the liquid in the operating chamber for braking, and the piston 2 is finally controlled to return, move upward from the lower stop point, and inhale liquid into the operating chamber. Specifically, according to usage requirements, the operation of the piston pump group may be a continuous process, that is, after the zero point calibration of the piston 2, the piston 2 continuously reciprocates between the zero point position and the lower stop point.

The embodiments of this application provide the piston pump group for a brake system and the control method thereof, and compared with the related art, this application has the following beneficial effects:

1. A limiting member 34 used for limiting movement of a follower 33 is disposed between a lead screw transmission assembly 32 and the follower 33, which can prevent the follower 33 from colliding and interfering with another component when the follower 33 moves upward (an operating volume of an operating chamber becomes larger). In addition, zero point calibration of a piston 2 can also be realized by using the limiting member 34, that is, after the follower 33 is blocked by the limiting member 34 and stops moving, the operating volume of the operating chamber is the largest, and the piston 2 is at a zero point position in this case, to ensure that liquid discharged from the piston pump group has sufficient pressure to provide stable brake pressure for the brake system.

2. The follower 33 is fixed to the piston 2 in a manner of threaded connection, which can well avoid expansion and deformation of the piston 2 due to press fitting by interference, and ensure that the piston 2 and the operating chamber have good coaxiality. In addition, the piston 2 and the operating chamber match tightly, and air tightness is good during a change process of the operating volume of the operating chamber.

3. The follower 33 is threadly connected to the piston 2, and the piston 2 is in surface contact with the follower 33, which increase a force bearing area of the two, so that a problem of stress concentration can be well avoided, thereby improving a service life of the piston 2.

4. A bearing inner ring 322 and a lead screw 324 are of an integrally formed structure, and have high structural strength, and there is no deformation of the bearing inner ring 322 when the bearing inner ring 322 and the lead screw 324 are press-fitted by interference, thereby ensuring stability of an overall structure of the piston pump group.

5. The lead screw 324 is designed by using a hollow structure, which can prevent negative pressure from generating between the piston 2 and the lead screw 324 when the piston 2 moves away from the limiting member 34 (moves downward), or prevent positive pressure from generating between the piston 2 and the lead screw 324 when the piston 2 moves close to the limiting member 34 (moves upward), so that resistance increases when the piston 2 moves, and then required energy consumption increases when the piston 2 is driven to move.

6. A distance between the piston 2 and the bottom of the operating chamber is determined by determining a relationship between a current rotation number and a preset revolution threshold, that is, the piston 2 is controlled to automatically stop moving at a lower stop point, to prevent the piston 2 from colliding with the bottom of the operating chamber when the piston 2 moves away from the limiting member 34 (moves downward), thereby prolonging the service life of the piston 2.

In the description of this application, it should be understood that orientation or position relationships indicated by the terms such as "center", "longitudinal", "transverse", "length", "width", "thickness", "on", "below", "front", "back", "left", "right", "vertical", "horizontal", "top", "bottom", "inside", "outside", "clockwise", "anticlockwise", "axial direction", "radial direction", and "circumferential direction" are based on orientation or position relationships shown in the accompanying drawings, and are used only for ease and brevity of illustration and description, rather than indicating or implying that the mentioned apparatus or component must have a particular orientation or must be constructed and operated in a particular orientation. Therefore, such terms should not be construed as limiting of this application.

In addition, the terms "first" and "second" are used for descriptive purposes only and are not to be construed as indicating or implying relative importance or implicitly indicating the number of technical features indicated. Therefore, a feature defined by "first" or "second" can explicitly or implicitly includes one or more features. In the descriptions of this application, "a plurality of" means two or more, unless otherwise definitely and specifically limited.

In this application, unless otherwise explicitly specified or defined, the terms such as "install", "connect", "connection", and "fix" should be understood in a broad sense. For example, the connection may be a fixed connection, a detachable connection, or an integral connection; or the connection may be a mechanical connection or an electrical connection; or the connection may be a direct connection, an indirect connection through an intermediate medium, internal communication between two components, or an interaction relationship between two components. A person of ordinary skill in the art may understand the specific meanings of the foregoing terms in this application according to specific situations.

In this application, unless otherwise explicitly specified or defined, the first feature being located "above" or "below" the second feature may be the first feature being in a direct contact with the second feature, or the first feature being in an indirect contact with the second feature through an intermediary. In addition, the first feature being located "above" the second feature may be the first feature being located directly above or obliquely above the second feature, or may simply indicate that the first feature is higher in level than the second feature. The first feature being located "below" the second feature may be the first feature being located directly below or obliquely below the second feature, or may simply indicate that the first feature is lower in level than the second feature.

In the descriptions of this specification, descriptions of a reference term such as "an embodiment," "some embodiments," "an example," "a specific example," or "some examples" means that a feature, structure, material, or characteristic that is described with reference to the embodiment or the example is included in at least one embodiment or example of this application. In this specification, schematic descriptions of the foregoing terms are not necessarily directed at the same embodiment or example. Moreover, the specific features, structures, materials, or characteristics described may be combined in any one or more embodiments or examples in a suitable manner. In addition, different embodiments or examples described in the present specification, as well as features of different embodiments or examples, may be integrated and combined by those skilled in the art without contradicting each other.

Although the embodiments of this application have been shown and described above, it can be understood that, the foregoing embodiments are exemplary and should not be understood as limitation to this application. A person of ordinary skill in the art can make changes, modifications, replacements, or variations to the foregoing embodiments within the scope of this application.

What is claimed is:

1. A piston pump group for a brake system, comprising a piston, a pump body provided with an operating chamber, and a transmission mechanism configured to drive the piston to move in the operating chamber, wherein the transmission mechanism comprises a lead screw transmission assembly, a follower, and a planetary gear assembly configured to transmit power to the lead screw transmission assembly, the follower is fixedly connected to the piston, the lead screw transmission assembly is configured to drive the follower to move relative to the operating chamber, and a limiting member configured to limit the movement of the follower is disposed between the lead screw transmission assembly and the follower;

wherein the limiting member comprises a limiting pin forming a collision portion and the follower comprises a collision structure configured to abut the collision portion;

wherein the planetary gear assembly comprises an inner gear ring, a planetary cover, and a plurality of planetary gear respectively meshed with the inner gear ring;

wherein the planetary cover is connected to the inner gear ring through a positioning structure;

wherein the lead screw transmission assembly comprises a bearing outer ring, a bearing inner ring, a bearing holder, and a lead screw, the bearing outer ring is sleeved outside the bearing inner ring, the bearing holder is disposed between the bearing outer ring and the bearing inner ring, the bearing holder is provided with a plurality of accommodation cavities configured to accommodate ball bearings, the bearing inner ring is fixedly connected to one end of the lead screw, the follower is threadably connected to the lead screw, the plurality of planetary gears are disposed on a top surface of the bearing inner ring through a planetary pin, and the planetary cover is fixedly connected to the bearing outer ring.

2. The piston pump group for a brake system according to claim 1, wherein the positioning structure comprises a groove disposed in a circumferential direction of an inner ring of the planetary cover and a protrusion disposed in a circumferential direction of an outer ring of the inner gear ring and configured to cooperate with the groove, or the positioning structure comprises a protrusion disposed in the circumferential direction of the inner ring of the planetary cover and a groove disposed in the circumferential direction of the outer ring of the inner gear ring and configured to cooperate with the protrusion.

3. The piston pump group for a brake system according to claim 1, wherein the lead screw and the bearing inner ring are integrally formed.

4. The piston pump group for a brake system according to claim 3, wherein the lead screw comprises a hollow structure with a through hole disposed in an axial direction of the lead screw.

5. The piston pump group for a brake system according to claim 1, wherein the limiting pin penetrates through the bearing inner ring to form the collision portion.

6. A method for controlling the piston pump group for a brake system according to claim 1, the method comprising zero point calibration of the piston; and comprising the steps of:
   S10: rotating a motor in a first direction to drive the planetary gear assembly to rotate in the first direction and to drive the lead screw transmission assembly to rotate in the first direction to move the follower toward the limiting member; and
   S11: stopping the motor when the collision structure of the follower contacts the limiting member such that the planetary gear assembly and the lead screw transmission assembly stop rotating, the follower and the piston stop moving axially, and the piston is at a zero point position.

7. The method according to claim 6, further comprising automatically stopping the piston at a lower stop point after step S11, wherein the lower stop point is a preset distance from an inner wall of the bottom of the pump body.

8. The method according to claim 7, wherein automatically stopping the piston at the lower stop point comprises:
   S20: rotating the motor in a second direction; to drive the planetary gear assembly to rotate in the second direction and to drive the lead screw transmission assembly to rotate in the second direction to move the follower away from the limiting member, and obtaining a current rotation number of the motor or a current rotation number of the lead screw transmission assembly in real time;
   S21: determining whether the current rotation number exceeds a preset revolution threshold; and performing step S20 if the current rotation number does not exceed the preset revolution threshold; and performing step S22 if the current rotation number is equal to the preset revolution threshold; and
   S22: stopping the motor such that the planetary gear assembly and the lead screw transmission assembly stop rotating in the second direction, the follower and the piston stop moving axially, and the piston is at the lower stop point.

9. The piston pump group for a brake system according to claim 3, wherein the limiting pin penetrates through the bearing inner ring.

10. The piston pump group for a brake system according to claim 4, wherein the limiting pin penetrates through the bearing inner ring.

11. The piston pump group for a brake system according to claim 2, wherein the lead screw and the bearing inner ring are integrally formed.

12. The piston pump group for a brake system according to claim 11, wherein the lead screw comprises a hollow structure; with a through hole disposed in an axial direction of the lead screw.

13. The piston pump group for a brake system according to claim 12, wherein the limiting pin penetrates through the bearing inner ring.

14. A method for controlling the piston pump group for a brake system according to claim 13, the method comprising zero point calibration of the piston, and comprising the following steps:
   S10: rotating a motor in a first direction; to drive the planetary gear assembly to rotate in the first direction and to drive the lead screw transmission assembly to rotate in the first directions to move the follower toward the limiting member; and
   S11: stopping the motor when the collision structure of the follower contacts the limiting member such that the planetary gear assembly and the lead screw transmission assembly stop rotating, the follower and the piston stop moving axially, and the piston is at a zero point position.

15. The method according to claim 14, further comprising automatically stopping the piston a lower stop point after stopping the motor, wherein the lower stop point is a preset distance from an inner wall of a bottom of the pump body.

16. The method according to claim 15, wherein automatically stopping the piston at the lower stop point comprises:
   S20: rotating the motor in a second direction to drive the planetary gear assembly to rotate in the second direction and to drive the lead screw transmission assembly to rotate in the second direction to move the follower away from the limiting member, and obtaining a current rotation number of the motor or a current rotation number of the lead screw transmission assembly in real time;
   S21: determining whether the current rotation number exceeds a preset revolution threshold; and performing step S20 if the current rotation number does not exceed the preset revolution threshold and performing step S22 if the current rotation number is equal to the preset revolution threshold; and
   S22: stopping the motor such that the planetary gear assembly and the lead screw transmission assembly stop rotating in the second direction, the follower and the piston stop moving axially, and the piston is at the lower stop point.

* * * * *